Patented Oct. 18, 1932

1,882,804

UNITED STATES PATENT OFFICE

JOHN WATSON GILBERT, OF PARLIN, NEW JERSEY, ASSIGNOR TO E. I. DU PONT DE NEMOURS & COMPANY, OF WILMINGTON, DELAWARE, A CORPORATION OF DELAWARE

STABILIZER FOR LEAD CHROMATE PIGMENTS

No Drawing.   Application filed August 23, 1929.   Serial No. 388,037.

This invention relates to coating compositions of the type using cellulose derivative vehicles. More particularly it relates to that type of coating composition using lead chromate pigments in cellulose derivative vehicles. Still more particularly it relates to means of preventing the color change of lead chromate pigments in cellulose derivative vehicles to which inert white pigments have been added.

It has been customary in the art to use cellulose derivative vehicles in coating compositions and, in order to obtain pleasing colors, to use lead chromate pigments such as chrome yellow, chrome orange, chrome green. It is customary in the art to sometimes use certain inert white pigments in combination with the lead chromate pigments in coating compositions of this character. The inert white pigments most generally used for this purpose are antimony oxide, stannic oxide, titanium oxide, and "titanox" which is made up of titanium oxide and barytes. It has been discovered, however, that although these mixed pigments have excellent characteristics they also exhibit a change in color on exposure to weather. For instance the chrome yellow and chrome orange fade out to a whitish cast, while chrome greens become distinctly bluish in shade.

This invention has as an object the provision of means which will remove the undesirable features of pigments of the character described above, which will prevent color change and in general produce a more satisfactory coating composition. Another object of the invention is to retain the non-chalking characteristics of coating compositions using pigments of tin or antimony oxide. Other objects of the invention will be in part set forth below and in part will be apparent.

These objects are accomplished by the following invention which consists, broadly, in adding zinc oxide and/or leaded zinc oxide in proper quantities to the pigments of the coating composition.

In studying methods of preventing color change, I have discovered that the addition of zinc oxide and/or leaded zinc oxide in small proportions affords the relief and improvement desired, and that coatings containing lead chromate pigments and proper proportions of these materials do not change color on exposure to the weather. I have found that zinc oxide or leaded zinc oxide ranging from 5-30% of the total white pigments is effective to retard or prevent color change, and that in most cases the best results are obtained using a white pigment containing from 20-25% zinc oxide or leaded zinc oxide.

In the preparation of this coating compound zinc oxide with inert white pigments are mixed into a vehicle consisting of cellulose derivatives, natural or synthetic resins, drying or non-drying oils, plasticizers, solvents, and diluents for the cellulose derivatives. The inclusion of the various pigments may be effected by any known method such as by means of roller mills, buhr stone mills, pebble mills.

The following examples of practical protective coatings using nitrocellulose as the cellulose derivative will serve to illustrate several of the preferred embodiments of the invention. It will be observed that Examples 1 and 2 show the use of zinc oxide with a lead chromate pigment but that the other examples do not indicate the type of coloring pigment to be used, it being apparent that the use of zinc oxide for this purpose is not limited to lead chromates but would be useful with any colored pigment.

*Example 1*

|   | Per cent |
|---|---|
| Low viscosity nitrocellulose | 10 |
| Damar resin | 3 |
| Castor oil | 3 |
| Dibutyl phthalate | 3 |
| Titanox | 8 |
| Zinc oxide | 2 |
| Lead chromate pigment | 3 |
| Solvents and diluents | 68 |
|   | 100 |

Example 2

| | Per cent |
|---|---|
| Low viscosity nitrocellulose | 10.0 |
| Damar resin | 3.0 |
| Castor oil | 3.0 |
| Dibutyl phthalate | 3.0 |
| Lead chromate | 1.5 |
| Titanium oxide | 5.0 |
| Leaded zinc oxide | 1.5 |
| Solvents and diluents | 73.0 |
| | 100.0 |

Example 3

| | Per cent |
|---|---|
| Low viscosity nitrocellulose | 10 |
| Damar resin | 3 |
| Castor oil | 3 |
| Dibutyl phthalate | 3 |
| Antimony oxide | 11 |
| Zinc oxide | 3 |
| Solvents and diluents | 67 |
| | 100 |

Example 4

| | Per cent |
|---|---|
| Low viscosity nitrocellulose | 10 |
| Damar resin | 3 |
| Castor oil | 3 |
| Dibutyl phthalate | 3 |
| Antimony oxide | 9 |
| Leaded zinc oxide | 2 |
| Solvents and diluents | 70 |
| | 100 |

Example 5

| | Per cent |
|---|---|
| Low viscosity nitrocellulose | 10 |
| Damar resin | 3 |
| Castor oil | 3 |
| Dibutyl phthalate | 3 |
| Stannic oxide | 12 |
| Zinc oxide | 4 |
| Solvents and diluents | 65 |
| | 100 |

Example 6

| | Per cent |
|---|---|
| Low viscosity nitrocellulose | 10 |
| Damar resin | 3 |
| Castor oil | 3 |
| Dibutyl phthalate | 3 |
| Stannic oxide | 9 |
| Leaded zinc oxide | 2 |
| Solvents and diluents | 70 |
| | 100 |

It will be apparent that the invention is not limited to the formulæ and methods set forth above but that variations in the character of the vehicle, of the pigment, of the inert white pigment and of the coloring pigment, may be made without departing from the spirit of the invention. It will be observed that wide variations in percentages of zinc oxide or leaded zinc oixde can be had within the scope of the process disclosed. It will be noted that the invention, although it will find extreme usefulness in the coating of automobiles, can also be used to coat wooden objects, metal objects, refrigerators, signs, furniture, in short, can be used for any finishing purpose.

The most plausible theory of the invention in that antimony, stannic oxide, titanium and titanox being practically chemically inert will in themselves produce no reaction in a nitrocellulose film. On exposure to the weather nitrocellulose coatings slowly disintegrate forming acidic decomposition products which react with the chromium pigment and destroy its color.

This disintegration of the surface of the nitrocellulose film also releases small amounts of inert white pigments which cause a chalking effect. It is apparent, therefore, that the presence of zinc oxide or leaded zinc oxide acts to take up or react with these decomposition products, or more probably, to prevent the decomposition of the cellulose derivative vehicles. The prevention of chalking by leaded zinc oxide would seem to indicate that decomposition of coating was actually retarded.

Some advantages of my invention are that cellulosic protective coatings containing lead chromate colors are produced which do not change color on exposure to weather, and that decomposition of the cellulose derivative vehicle is prevented.

As many apparently widely different embodiments of this invention may be made without departing from the spirit and scope thereof, it is to be understood that I do not limit myself to the specific embodiments thereof except as defined in the appended claims.

I claim:

1. A coating composition comprising a cellulose derivative, a lead chromate pigment, an inert white pigment, and from 5–30%, by weight of said inert white pigment, of a pigment from the group consisting of zinc oxide and leaded zinc oxide.

2. A coating composition comprising a cellulose derivative, a lead chromate pigment, an inert white pigment, and from 20–25%, by weight of said inert white pigment, of a pigment from the group consisting of zinc oxide and leaded zinc oxide.

3. A coating composition comprising a cellulose derivative, a lead chromate pigment, an inert white pigment from the group consisting of antimony oxide, stannic oxide, titanium oxide, and "titanox", and from 5–30%, by weight of said inert white pigment, of a pigment from the group consisting of zinc oxide and leaded zinc oxide.

4. A coating composition comprising a cellulose derivative, a lead chromate pigment, an inert white pigment from the group consisting of antimony oxide, stannic oxide, titanium oxide, and "titanox", and from 20-25%, by weight of said inert white pigment, of a pigment from the group consisting of zinc oxide and leaded zinc oxide.

5. A coating composition comprising cellulose nitrate, a lead chromate pigment, an inert white pigment, and from 5-30%, by weight of said inert white pigment, of a pigment from the group consisting of zinc oxide and leaded zinc oxide.

6. A coating composition comprising cellulose nitrate, a lead chromate pigment, an inert white pigment, and from 20-25%, by weight of said inert white pigment, of a pigment from the group consisting of zinc oxide and leaded zinc oxide.

7. A coating composition comprising cellulose nitrate, a lead chromate pigment, an inert white pigment from the group consisting of antimony oxide, stannic oxide, titanium oxide, and "titanox", and from 5-30%, by weight of said inert white pigment, of a pigment from the group consisting of zinc oxide and leaded zinc oxide.

8. A coating composition comprising cellulose nitrate, a lead chromate pigment, an inert white pigment from the group consisting of antimony oxide, stannic oxide, titanium oxide, and "titanox", and from 20-25%, by weight of said inert white pigment, of a pigment from the group consisting of zinc oxide and leaded zinc oxide.

In testimony whereof, I affix my signature.

JOHN WATSON GILBERT.